United States Patent
Kuwamura

(10) Patent No.: US 7,855,523 B2
(45) Date of Patent: Dec. 21, 2010

(54) MOTOR DRIVING CIRCUIT AND DISC APPARATUS USING THE SAME

(75) Inventor: Makoto Kuwamura, Kyoto (JP)

(73) Assignee: Rohm Co., Ltd. (JP)

( * ) Notice: Subject to any disclaimer, the term of this patent is extended or adjusted under 35 U.S.C. 154(b) by 537 days.

(21) Appl. No.: 11/917,918

(22) PCT Filed: Jun. 19, 2006

(86) PCT No.: PCT/JP2006/312243

§ 371 (c)(1),
(2), (4) Date: Dec. 18, 2007

(87) PCT Pub. No.: WO2006/137360

PCT Pub. Date: Dec. 28, 2006

(65) Prior Publication Data

US 2010/0201295 A1   Aug. 12, 2010

(30) Foreign Application Priority Data

Jun. 20, 2005 (JP) ............................. 2005-179263
Oct. 20, 2005 (JP) ............................. 2005-305989

(51) Int. Cl.
*H02P 6/18* (2006.01)
(52) U.S. Cl. ........................ 318/400.25; 318/400.24; 318/400.34
(58) Field of Classification Search ............ 318/400.06, 318/400.13, 400.24, 400.25, 400.32, 400.34, 318/400.36, 700, 702, 720–724
See application file for complete search history.

(56) References Cited

U.S. PATENT DOCUMENTS 4,874,993 A * 10/1989 Tanaka et al. .......... 318/400.35
(Continued)

FOREIGN PATENT DOCUMENTS

JP           3-207250 A       9/1991
(Continued)

OTHER PUBLICATIONS

International Search Report for International Application No. PCT/JP2006/312243 mailed Aug. 29, 2006.
(Continued)

*Primary Examiner*—Bentsu Ro
(74) *Attorney, Agent, or Firm*—Cantor Colburn LLP

(57) ABSTRACT

A back electromotive detection comparator compares back electromotive voltages Vu to Vw with a common voltage Vn of coils, and generates first rectangular wave signals Pu to Pw. A masking circuit performs masking of the first rectangular wave signals Pu to Pw, and outputs the resultant signals as second rectangular wave signals Mu to Mw. An output circuit supplies a drive current to coils on the basis of the second rectangular wave signals Mu to Mw. A frequency generating circuit generates a frequency generation signal SigFG whose level switches at every edge of the second rectangular wave signals Mu to Mw. A mask signal generating circuit generates a mask signal MSK which is at a high level during an interval multiplied by a coefficient to a pulse width Tp of the frequency generation signal SigFG after level transition of the frequency generation signal SigFG. The masking circuit nullifies level fluctuation of the first rectangular wave signals Pu to Pw during an interval when a mask signal MSK is at the high level.

13 Claims, 9 Drawing Sheets

U.S. PATENT DOCUMENTS

| | | | | |
|---|---|---|---|---|
| 5,923,134 | A | * | 7/1999 | Takekawa .............. 318/400.01 |
| 6,111,372 | A | * | 8/2000 | Nishimura ............. 318/400.34 |
| 7,106,013 | B2 | * | 9/2006 | Narumi et al. ......... 318/400.25 |
| 7,492,113 | B2 | * | 2/2009 | Maeda .................. 318/400.01 |

FOREIGN PATENT DOCUMENTS

| | | | |
|---|---|---|---|
| JP | 10-243685 | A | 9/1998 |
| JP | 11-299283 | A | 10/1999 |
| JP | 2003-244983 | A | 8/2003 |
| JP | 2004-15946 | A | 1/2004 |

OTHER PUBLICATIONS

Written Opinion of the International Searching Authority for PCT/JP2006-312243 mailed Aug. 29, 2006.

\* cited by examiner

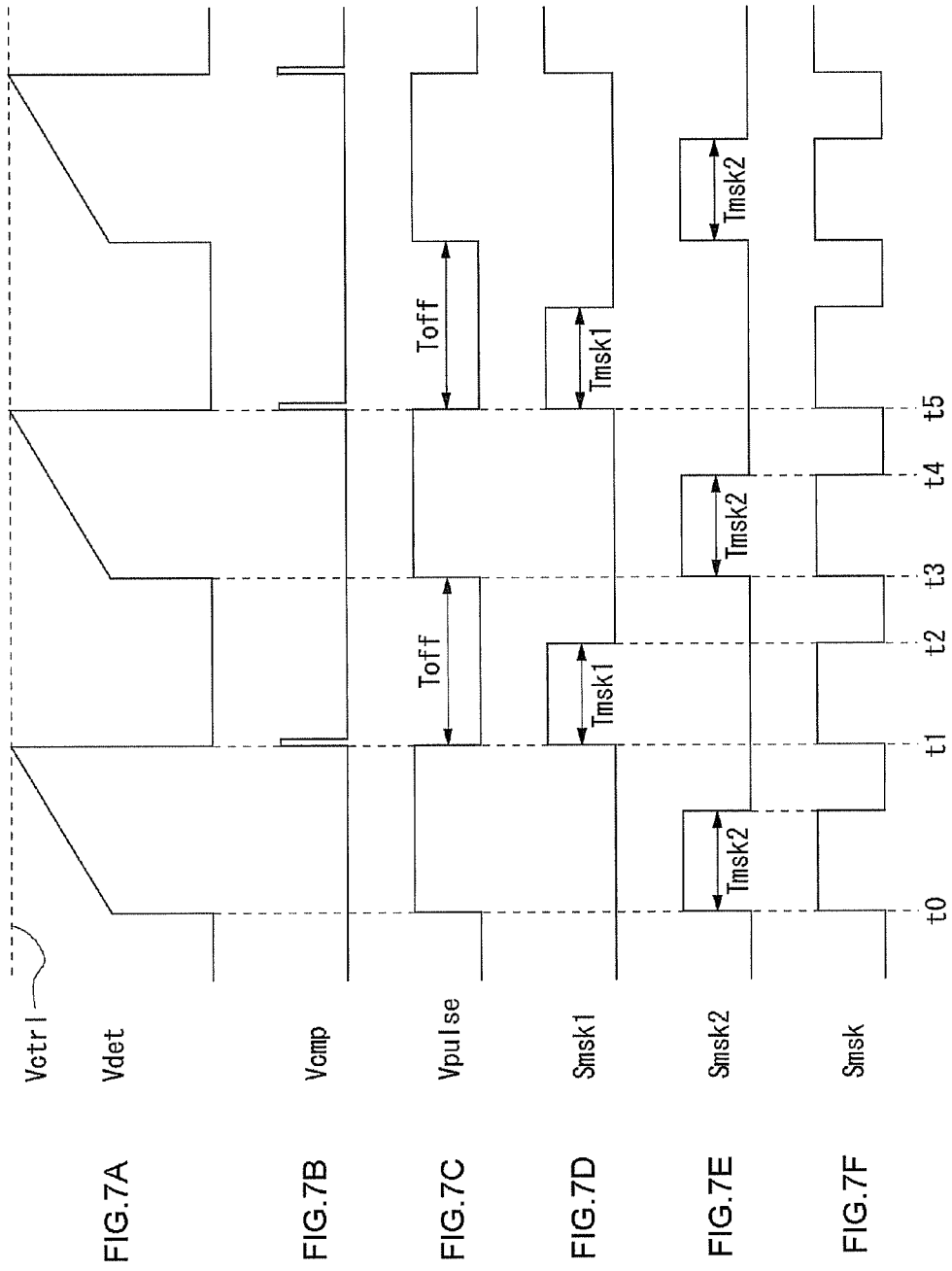

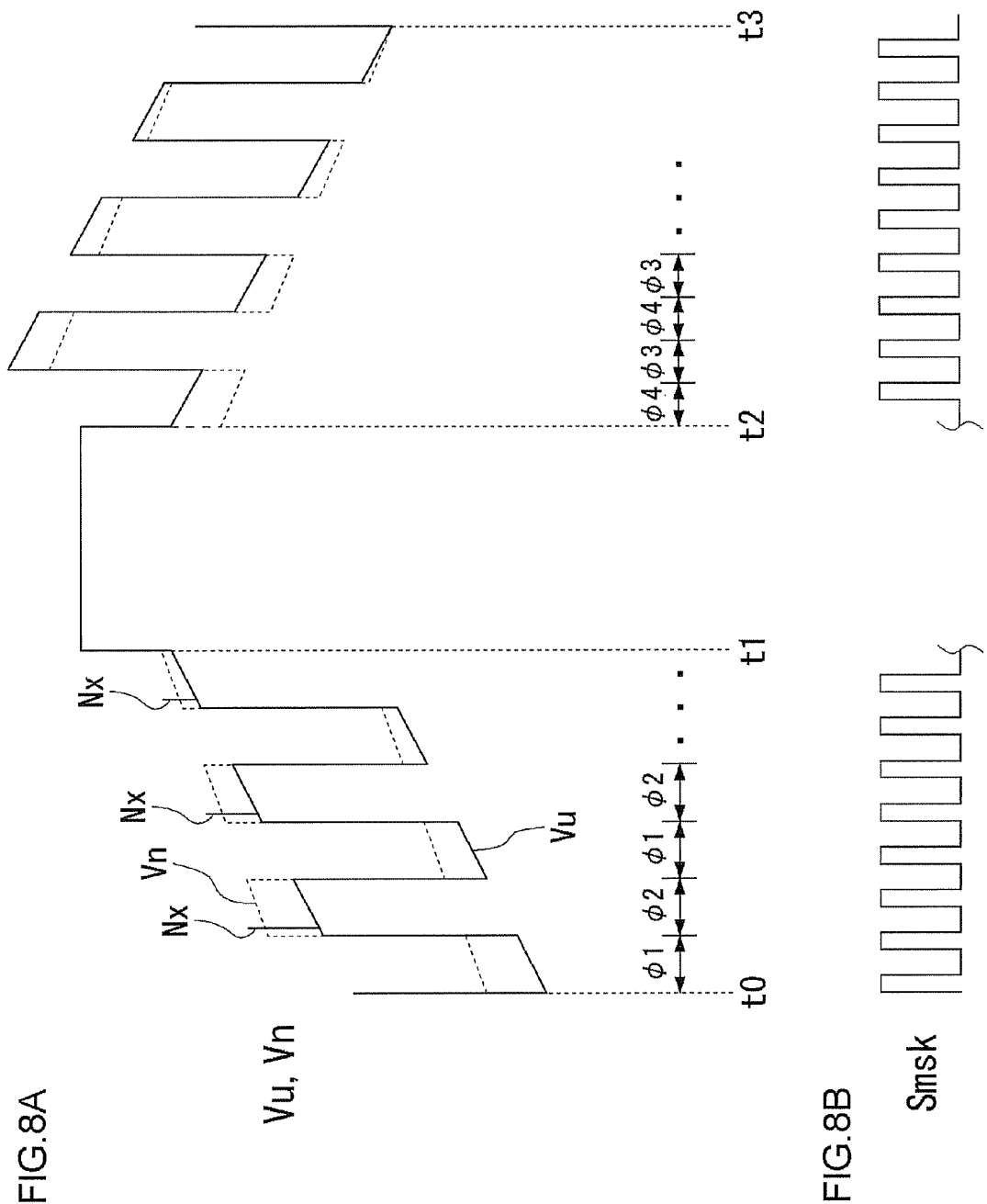

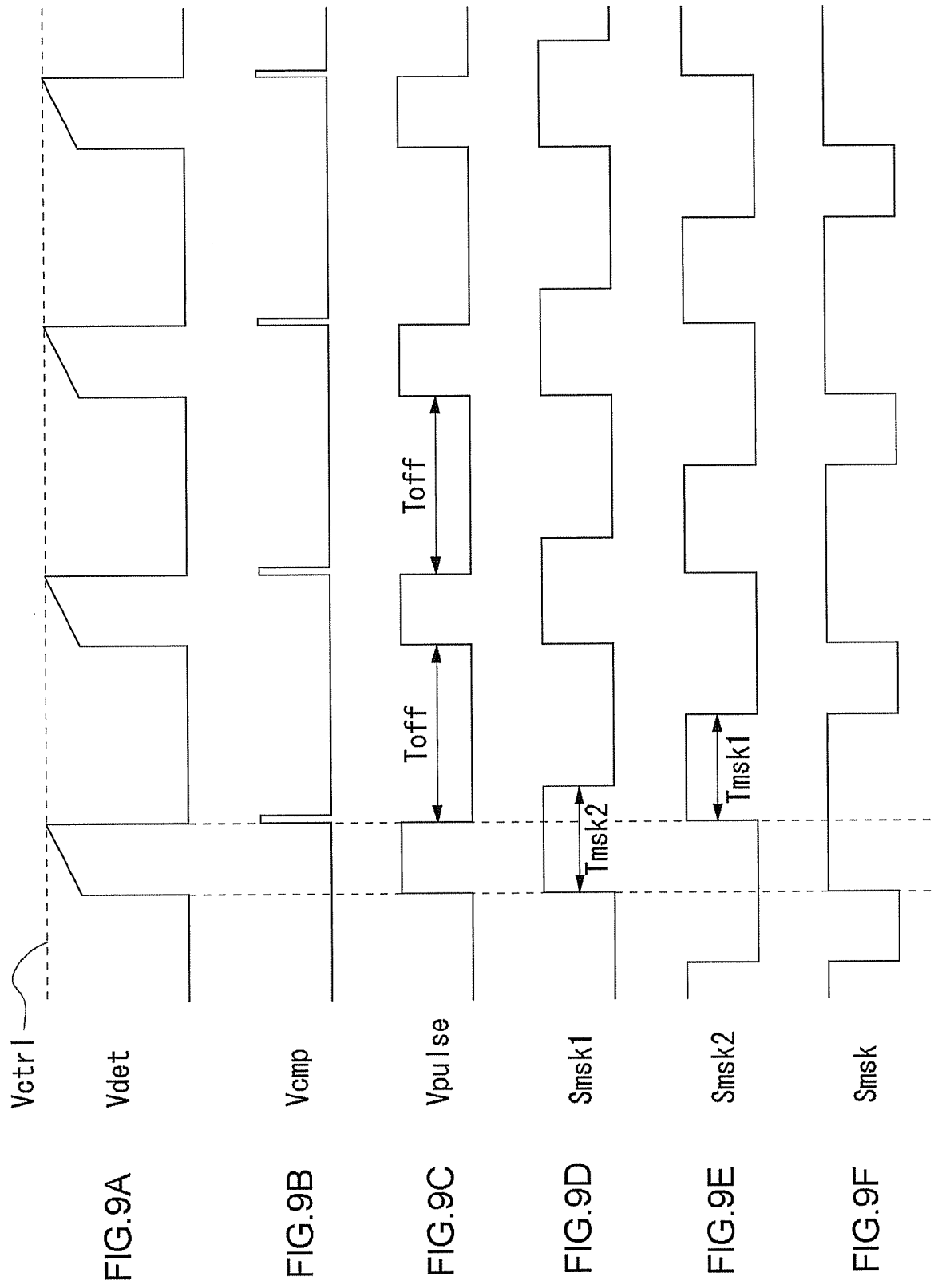

MOTOR DRIVING CIRCUIT AND DISC APPARATUS USING THE SAME

CROSS REFERENCE TO RELATED APPLICATIONS

This is a U.S. national stage of application No. PCT/JP2006/312243, filed on 19 Jun. 2006. Priority under 35 U.S.C. §119(a) and 35 U.S.C. §365(b) is claimed from Japanese Application No. 2005-179263, filed 20 Jun. 2005, and Japanese Application No. 2005-305989, filed 20 Oct. 2005, the disclosures of which are both also incorporated herein by reference.

1. FIELD OF THE INVENTION

The present invention relates to a motor driving circuit which controls rotation of a motor including a stator having a plurality of coils and a rotor having magnetism.

2. DESCRIPTION OF THE RELATED ART

In electronic equipment using disc media such as a portable compact disc (referred to as CD) apparatus and a digital versatile disc (referred to as DVD), a brushless direct current (referred to as DC) motor is used to rotate a disc thereof. The brushless DC motor includes, generally, a rotor having permanent magnets, and a stator provided with a plurality of star-connected phases of coils; the coils are excited by controlling an electric current to be supplied to the coils; and the rotor is driven by relatively rotating with respect to the stator. In order to detect a rotational position of the rotor, the brushless DC motor generally includes sensors such as a hall element and an optical encoder; and an appropriate torque is given to the rotor by switching the current to be supplied to each phase coil in response to a position detected by the sensors.

In order to further reduce in size of a motor, there is also proposed a sensorless motor which detects a rotational position of a rotor without using a sensor such as a hall element (for example, see Patent Document 1). The sensorless motor measures, for example, a potential of common-terminal wiring of the motor; and accordingly, an induced voltage across the coil is detected to obtain position information.

As to be described in "Problems to be solved by the Invention," Patent Document 2 discloses a sensorless motor in which there is a problem in that motor rotation becomes unstable because a spike-like noise appears in a back electromotive voltage across each phase coil due to back electromotive noise.

Patent Document 1: Japanese Patent Application Laid open No. H3-207250

Patent Document 2: Japanese Patent Application Laid open No. H10-243685

In order to reduce influence due to such back electromotive noise, the present applicant proposed a technique in the above patent document 2 that a transition in signal level due to the back electromotive noise is masked during a predetermined interval when the back electromotive noise generates, and accordingly the influence due to the aforementioned back electromotive noise on a motor driving is reduced. In the technique disclosed in the patent document 2, the interval which masks the back electromotive noise is fixed to a predetermined value; and therefore, in an application in which motor rotational speed largely changes, there leaves room for improvement in stability of the motor.

SUMMARY OF THE INVENTION

The present invention has been made in view of the foregoing, and a general purpose of the present invention is to provide a motor driving circuit capable of stabilizing rotation by removing noise.

An embodiment of the present invention relates to a motor driving circuit which supplies a drive current to a multiphase motor to drive the multiphase motor. The motor driving circuit includes: a back electromotive detection comparator which compares a back electromotive voltage across each phase coil of the multiphase motor respectively with a common voltage of the each phase, and generates a first rectangular wave signal of each phase; a masking circuit which performs a masking process that removes a noise component from a first rectangular wave signal of the each phase output from the back electromotive detection comparator, and outputs the resultant signal as a second rectangular wave signal of each phase; an output circuit which supplies the drive current to each phase coil of the multiphase motor on the basis of the second rectangular wave signal of the each phase; a frequency generating circuit which detects the edge of the second rectangular wave signal of the each phase, and generates a frequency generation signal whose level switches at each detected edge; and a mask signal generating circuit which generates a mask signal to be at a predetermined level during an interval multiplied by a predetermined coefficient to a pulse width of the frequency generation signal after level transition of the frequency generation signal. The masking circuit performs a masking process that nullifies level fluctuation of the first rectangular wave signal during an interval when the mask signal is at the predetermined level.

According to the embodiment, an interval that nullifies the fluctuation of the first rectangular wave signal specified by the mask signal changes in response to the pulse width of the frequency generation signal, that is, motor rotational speed; and therefore, even when the motor rotational speed fluctuates, back electromotive noise or the like can be suitably removed from the first rectangular wave signal and the motor can be stably rotated.

The mask signal generating circuit may includes: a counter which is reset at every level transition of the frequency generation signal, and starts counting; a register which holds a counted value at the time of reset counted by the counter; and a mask width setting unit which outputs a mask signal having a pulse width corresponding to an obtained value multiplied by the predetermined coefficient to the counted value held by the register.

The register may hold a counted value of the frequency generation signal which is one before with respect to the mask signal to be output. In this case, a motor rotational speed just past is reflected to the mask time; and therefore, the motor can be stably driven even when the motor rotational speed is rapidly changed.

The mask signal generating circuit may output the mask signal having a predetermined fixed value as a pulse width when starting driving of the multiphase motor.

When starting driving of the motor, the pulse width of the mask signal is fixed; and accordingly, the frequency signal can be fixed.

Another embodiment of the present invention also relates to a motor driving circuit which supplies a drive current to a multiphase motor to drive the multiphase motor. The motor driving circuit includes: a current-voltage conversion unit which converts the drive current flowing in each phase coil of the multiphase motor into a voltage; a pulse modulation comparator which compares a detection voltage output from the current-voltage conversion unit with a control voltage that directs a torque; a pulse signal generating circuit which refers to a comparison signal output from the pulse modulation comparator, and generates a pulse signal which is at a first level indicating a non-conducting (de-energized) state of the each phase coil during an interval from when the detection voltage reaches the control voltage to when a predetermined off time elapses and at a second level indicating a conducting (energized) state of the each phase coil during an interval except for the same; a mask signal generating circuit which generates a mask signal to be at a predetermined level during an interval from when the pulse signal transits to the first level to when a predetermined first mask time has passed, and an interval from when the pulse signal transits to the second level to when a predetermined second mask time has passed; a back electromotive detection comparator which compares a back electromotive voltage across each phase coil of the multiphase motor respectively with a common voltage of the each phase coil, and generates a first rectangular wave signal of each phase; a masking circuit which refers to the mask signal output from the mask signal generating circuit, performs a masking process that nullifies level fluctuation of the first rectangular wave signal of the each phase output from the back electromotive detection comparator during an interval when the mask signal is at the predetermined level, and outputs the resultant signal as a second rectangular wave signal of each phase; and an output circuit which intermittently supplies the drive current to each phase coil of the multiphase motor on the basis of the second rectangular wave signal and the pulse signal of the each phase.

According to the embodiment, the conduction state of each phase coil of the multiphase motor is controlled on the basis of the pulse signal in which an off-time is constant and an on-time changes in response to a torque. In this case, an interval from the positive edge and the negative edge of the pulse signal till a predetermined mask time has passed is set as a mask interval; and accordingly, back electromotive noise which generates in each phase coil at every cycle of the pulse signal can be removed, and phase switching timing can be suitably set.

The first mask time may be set to be shorter than the off-time. In this case, a detection interval which detects a zero cross of a back electromotive voltage can be surely provided after elapsing the first mask time. Furthermore, the first mask time may be set to be not more than the second mask time.

The pulse signal generating circuit may include a counter circuit which starts counting of the off-time when level transition of the comparison signal; and may output the pulse signal which is at the first level during an interval from level transition of the comparison signal and to completion of counting, and then, transits to the second level.

The mask signal generating circuit may include a counter circuit which counts the first and second mask times when level transition of the pulse signal occurs.

The off-time and the mask time can be suitably set on the basis of a system clock signal and adjustment of their times becomes easy by configuring the pulse signal generating circuit and the mask signal generating circuit using the counter circuit.

The pulse signal generating circuit and the mask signal generating circuit are integrally configured, including: a first counter circuit which starts counting when level transition of the comparison signal and outputs the pulse signal whose level transits after elapsing the off-time and a second mask signal whose level transits after elapsing the second mask time, and a second counter circuit which starts counting when level transition of the pulse signal output from the first counter circuit occurs, and outputs a first mask signal whose level transits after elapsing the first mask time; and output a logical operation result of the first mask signal and the second mask signal as the mask signal.

An embodiment of a motor driving circuit may be integrally integrated on one semiconductor substrate. "Integral integration" may include the case where all constitutional elements in a circuit are formed on a semiconductor substrate, and the case where major constitutional elements in the circuit are integrally integrated; and a part of resistors and capacitors may be provided on the outside of the semiconductor substrate for adjusting circuit constants. In this case, a circuit area can be reduced.

Another embodiment of the present invention is a disc apparatus. The disc apparatus includes: a spindle motor that is a multiphase motor which rotates a disc; and a motor driving circuit that drives the spindle motor, which is any one of the above embodiments. According to the embodiment, influence of back electromotive noise can be suppressed and a rotational speed of the disc can be stabilized.

It is to be noted that any arbitrary combination or rearrangement of the above-described structural components and so forth is effective as and encompassed by the present embodiments.

Moreover, this summary of the invention does not necessarily describe all necessary features so that the invention may also be a sub-combination of these described features.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which:

FIGS. 7A to 7F are time charts showing operation states of the motor driving circuit shown in FIG. 5;

FIGS. 8A and 8B are time charts showing a back electromotive voltage of U phase, a common voltage, and a mask signal; and FIGS. 9A to 9F are time charts showing operation states of the motor driving circuit shown in FIG. 5 when a control voltage is low.

DETAILED DESCRIPTION OF THE INVENTION

The invention will now be described based on preferred embodiments which do not intend to limit the scope of the present invention but exemplify the invention. All of the features and the combinations thereof described in the embodiment are not necessarily essential to the invention.

First Embodiment

Figure 1:
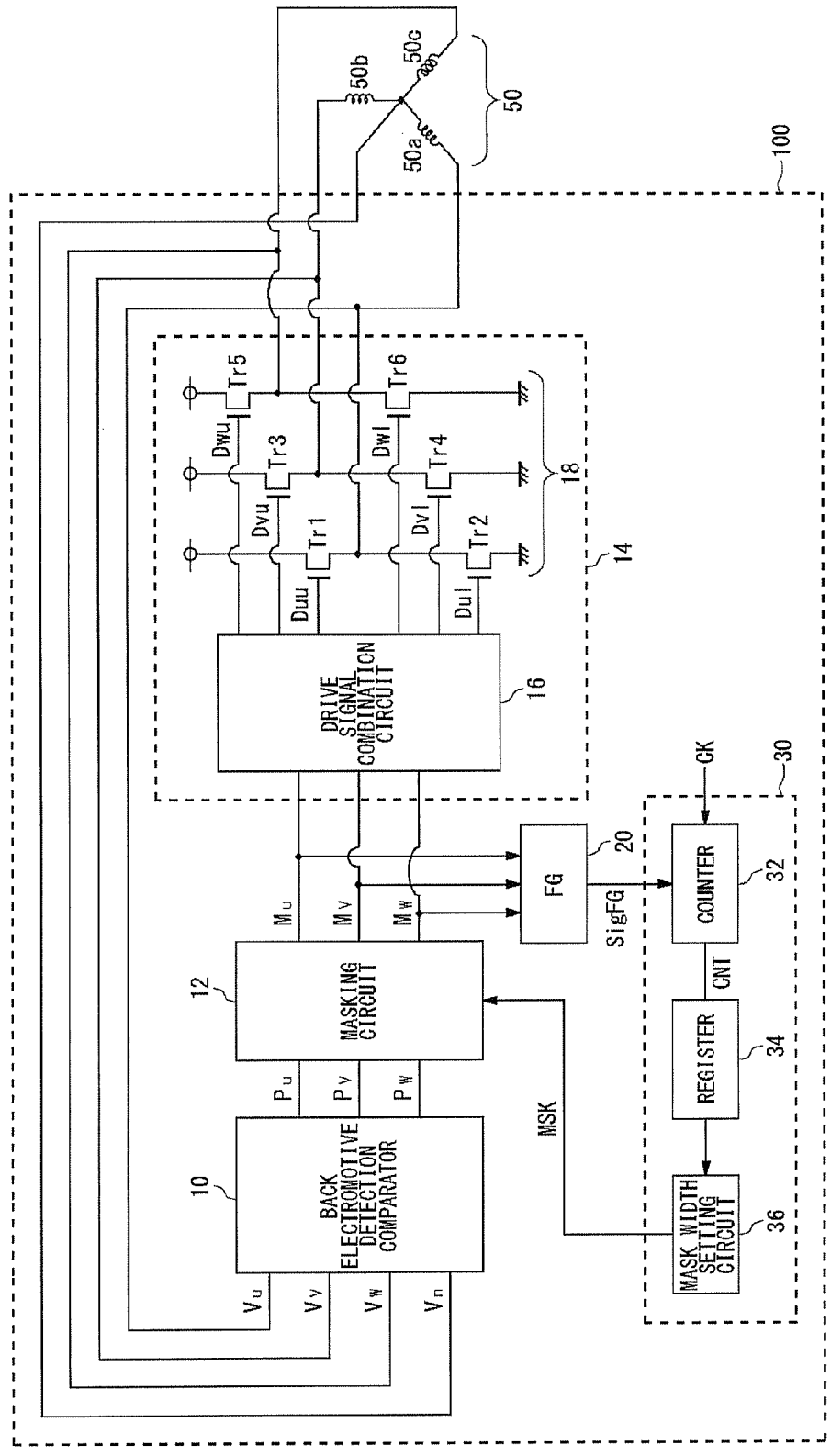
FIG. 1 is a circuit diagram showing a configuration of a motor driving circuit according to an embodiment.

FIG. 1 is a circuit diagram showing a configuration of a motor driving circuit 100 according to a first embodiment. The motor driving circuit 100 supplies a drive current to a sensorless brushless DC motor (referred to as merely "motor" below) 50 to control rotation. The motor 50 is a three-phase DC motor including coils 50a to 50c of U phase, V phase, and W phase.

The motor driving circuit 100 includes a back electromotive detection comparator 10, a masking circuit 12, an output circuit 14, a frequency generating circuit 20, and a mask signal generating circuit 30. The motor driving circuit 100 is a functional IC integrally integrated on one semiconductor substrate.

The back electromotive detection comparator 10 compares back electromotive voltages Vu to Vw across respective phase coils 50a to 50c of the motor 50 respectively with a common voltage Vn of multiphase coils, and generates first rectangular wave signals Pu to Pw of respective phases. The first rectangular wave signal Pu is at a high level if Vu>Vn is satisfied; and, at a low level if Vu<Vn is satisfied. Similarly, the first rectangular wave signal Pv is at a high level if Vv>Vn is satisfied; and, at a low level if Vv<Vn is satisfied. The first rectangular wave signal Pw is at a high level if Vw>Vn is satisfied; and, at a low level if Vw<Vn is satisfied.

The masking circuit 12 performs a masking process which removes a noise component from the first rectangular wave signals Pv to Pw of respective phases output from the back electromotive detection comparator 10, and outputs the resultant signals as second rectangular wave signals Mu to Mw of respective phases. The output circuit 14 supplies the drive current to respective phase coils 50a to 50c of the motor 50 on the basis of the second rectangular wave signals Mu to Mw of respective phases.

The frequency generating circuit 20 is a position detection circuit which is for detecting a position of a rotor; and the frequency generating circuit 20 detects transition edges of the second rectangular wave signals Mu to Mw of respective phases, and generates a frequency generation signal SigFG whose level switches to a high level or a low level at respective detected edges. For example, the frequency generation signal SigFG can be generated by calculating exclusive OR of the second rectangular wave signals Mu to Mw.

The mask signal generating circuit 30 generates a mask signal MSK which is at a high level during an interval multiplied by a predetermined coefficient to a pulse width Tp of the frequency generation signal SigFG. The pulse width Tp of the frequency generation signal SigFG means a time from when a signal level transits to when the signal level subsequently transits. The mask signal MSK is output to the masking circuit 12.

The mask signal generating circuit 30 includes a counter 32, a register 34, and a mask width setting circuit 36. The counter 32 counts a clock signal CK inputted from outside. The frequency generation signal SigFG is inputted to the counter 32, and a counted value CNT is reset at every switching of its signal level to start counting again. The register 34 sequentially hold the counted value CNT at the time of reset every when the counter 32 is reset. The mask width setting circuit 36 outputs the mask signal MSK which is at the high level during an interval corresponding to an obtained value multiplied by a predetermined coefficient α to the counted value CNT held by the register 34.

The masking circuit 12 performs a masking process that nullifies level fluctuation of the first rectangular wave signals Pu to Pw during an interval when the mask signal MSK is at the high level after any one of the first rectangular wave signals Pu to Pw transits. That is, during the interval when the mask signal MSK is at the high level, even signal levels of the first rectangular wave signals Pu to Pw fluctuate, their fluctuations are not reflected to the second rectangular wave signals Mu to Mw. On the other hand, during an interval when the mask signal MSK is at the low level, the second rectangular wave signals Mu to Mw are equal to the first rectangular wave signals Pu to Pw, respectively.

The output circuit 14 controls a current to be supplied to three phase coils 50a to 50c which constitute a stator of the motor 50. The output circuit 14 includes a drive signal combination circuit 16 and a power transistor circuit 18. The power transistor circuit 18 includes six switching transistors Tr1 to Tr6, and the current to be supplied to the coils 50a to 50c is switched on/off by on/off switching of the transistors Tr1 to Tr6. On/off control of the transistors Tr1 to Tr6 is performed by the drive signal combination circuit 16.

The drive signal combination circuit 16 generates drive signals Duu to Dul to be applied to gates of the transistors Tr1 to Tr6 on the basis of the second rectangular wave signals Mu to Mw output from the masking circuit 12.

Figure 2:
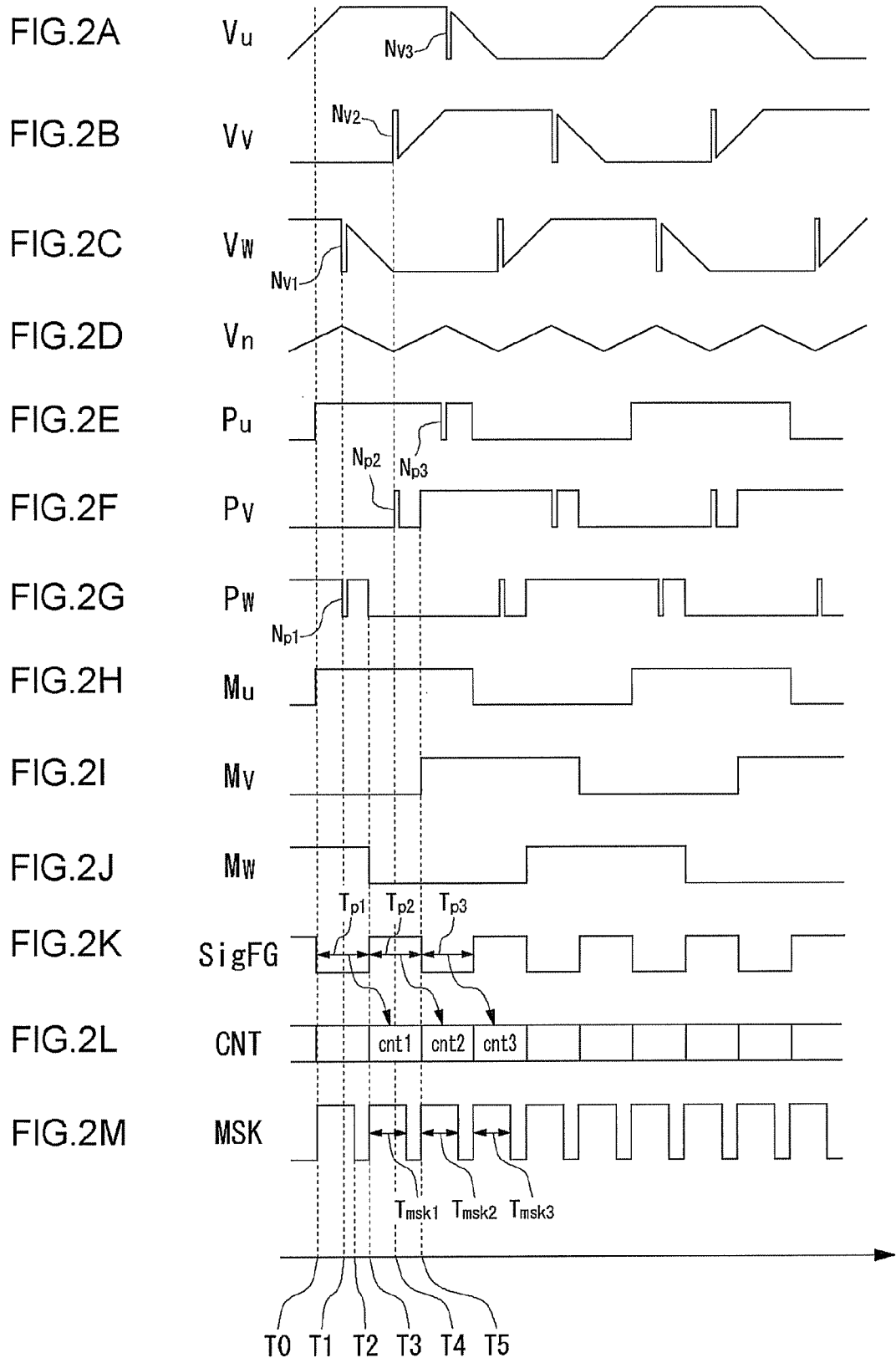
FIGS. 2A to 2M are time charts showing operation states of the motor driving circuit shown in FIG. 1.
Figure 3:
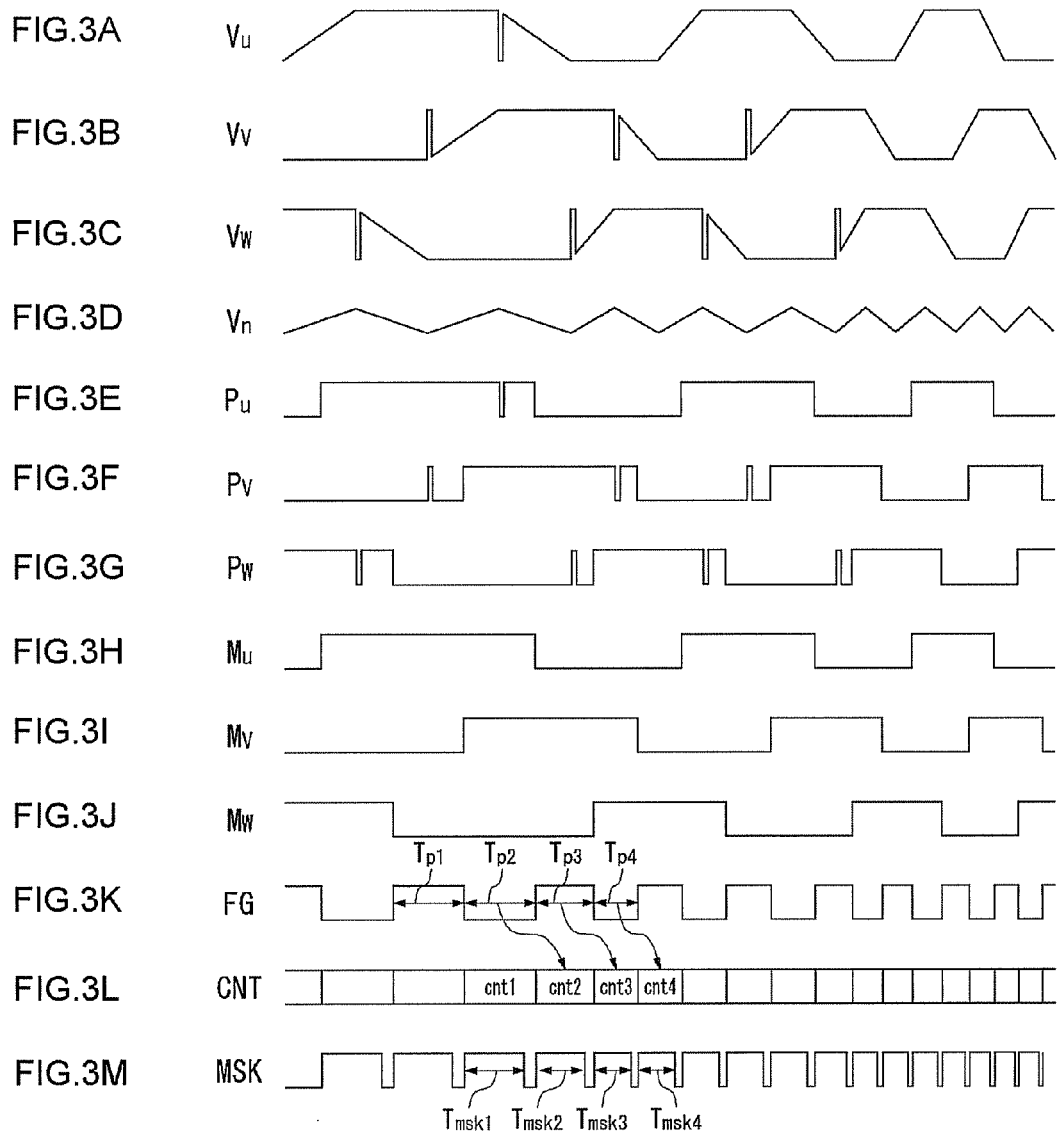
FIGS. 3A to 3M are time charts showing operation states when accelerating a motor of the motor driving circuit shown in FIG. 1.

An operation of a thus configured motor driving circuit 100 will be described. FIGS. 2A to 2M are time charts showing operation states of the motor driving circuit 100. FIGS. 2A to 2C represent back electromotive voltages Vu to Vw across respective phase coils 50a to 50c of a motor 50; FIG. 2D represents a common voltage Vn of the coils 50a to 50c; FIGS. 2E to 2G represent first rectangular wave signals Pu to Pw; FIGS. 2H to 2J represent second rectangular wave signals Mu to Mw; FIG. 2K represents a frequency generation signal SigFG; FIG. 2L represents a counted value CNT held by a register 34; and FIG. 2M represents a mask signal MSK.

A drive current is supplied to the coils 50a to 50c by an output circuit 14, the resultant back electromotive voltages Vu to Vw become periodic signals which differ in phase by 120 degrees from one another. A back electromotive detection comparator 10 compares the back electromotive voltages Vu to Vw respectively with the common voltage Vn, and generates the first rectangular wave signals Pu to Pw. Spike-like back electromotive noises Nv1 to Nv3 appear in the back electromotive voltages Vu to Vw and the back electromotive noises also appear in the first rectangular wave signals Pu to Pw as Np1 to Np3.

When the second rectangular wave signal Mu transits from a low level to a high level at time T0, a frequency generating circuit 20 detects the rising edge (positive edge), and switches the frequency generation signal SigFG to a low level. A counter 32 of a mask signal generating circuit 30 is reset at the same time when the frequency generation signal SigFG transits, and a new counting is started.

The mask signal MSK is at a high level at time T1 when the back electromotive noise Nv1 appears. As described above, a masking circuit 12 nullifies level fluctuation of the first rectangular wave signals Pu to Pw during an interval when the mask signal MSK is at the high level. Therefore, when focusing attention on W phase, the noise component Np1 which appears in the first rectangular wave signal Pw does not appear in the second rectangular wave signal Mw; and consequently, a flat signal in which influence of the back electromotive noise is removed can be obtained.

The mask signal MSK is at a low level at time T2, and the first rectangular wave signal Pw is at a low level at time T3. At the time T3, the mask signal MSK is at the low level; and the second rectangular wave signal Mw is also at the low level in order that the masking circuit 12 outputs the second rectangular wave signal Mw which follows level fluctuation of the first rectangular wave signal Pw. The frequency generating circuit 20 detects the falling edge (negative edge) of the second rectangular wave signal Mw, and switches the frequency generation signal SigFG from the low level to a high level. The counter 32 is reset to the time T3 again, and writes a previous counted value cnt1 on the register 34. The counted value cnt1 becomes a value corresponding to a pulse width Tp1 of the frequency generation signal SigFG shown by Tp1 in the drawing. That is, when a periodic time of a clock signal CK to be inputted to the counter 32 is set to Tck, cnt1=Tp1/Tck is made.

A mask width setting circuit 36 makes the mask signal MSK at the high level during a mask interval Tmsk1=α× cnt1×Tck corresponding to an obtained value (α×cnt1) multiplied by a predetermined coefficient α to the counted value cnt1 written on the mask width setting circuit 36. For example, the predetermined coefficient α may be set to approximately 13/16. The back electromotive noise Nv2 appears at time T4, and the back electromotive noise Np2 appears in the first rectangular wave signal Pv. The mask signal MSK is at the high level at the time T4 when the back electromotive noise Nv2 appears; and therefore, a noise component does not appear in the second rectangular wave signal Mv. Since the mask signal MSK is at the low level at time T5, the masking circuit 12 makes the second rectangular wave signal Mv at a high level at the same time when the first rectangular wave signal Pv is at a high level. The frequency generating circuit 20 detects the positive edge of the second rectangular wave signal Mv, and switches the frequency generation signal SigFG to the low level.

As described, according to the motor driving circuit 100 according to the present embodiment, the mask time Tmsk by the mask signal MSK is changed in response to the pulse width Tp of the frequency generation signal SigFG, that is, a rotational speed of the motor 50. As a result, even when the rotational speed of the motor 50 fluctuates, the back electromotive noise or the like is suitably removed from the first rectangular wave signals Vu to Vw; and therefore, the motor can be stably rotated.

Further, in the mask signal generating circuit 30, the register 34 holds a counted value CNT with respect to the frequency generation signal SigFG which is one before with respect to the mask signal MSK to be output; and the mask time Tmsk of the mask signal MSK is set on the basis of the counted value. As a result, a rotational speed of the motor 50 just past is reflected to the mask time Tmsk; and therefore, the motor can be stably driven even when the motor rotational speed is rapidly changed.

FIGS. 3A to 3M are time charts showing operation states of the motor driving circuit 100 when accelerating the motor 50. FIGS. 3A to 3M show waveforms corresponding to FIGS. 2A to 2M, respectively.

With the increase in rotational speed of the motor 50, a time when a drive current is supplied to respective phase coils 50a to 50c shortens. As a result, the back electromotive voltages Vu to Vw and periodic times of the first rectangular wave signals Pu to Pw and the second rectangular wave signals Mu to Mw gradually shorten. When the periodic times of the second rectangular wave signals Mu to Mw shorten, the time Tp in which the signal level of the frequency generation signal SigFG transits shortens; and consequently, the counted value CNT of the counter 32 held in the register 34 decreases. As a result, the mask time Tmsk of the mask signal MSK set by the mask width setting circuit 36 gradually shortens with the increase of the rotational speed of the motor 50.

When starting driving of the motor 50, the mask signal generating circuit 30 may set the mask time Tmsk of the mask signal MSK to a predetermined fixed value regardless of the pulse width Tp of the frequency generation signal SigFG. Just after starting driving the motor 50, any counted value is not held in the register 34. Consequently, the mask time Tmsk of the mask signal MSK is determined by setting the predetermined fixed value as an initial value; and the back electromotive noise is removed from the first rectangular wave signals Pu to Pw on the basis of the mask time Tmsk of the mask signal MSK. After that, as described above, the motor 50 can be stably rotated during an interval from starting driving to reaching a predetermined rotational speed by setting the mask time Tmsk of the mask signal MSK in response to the pulse width Tp of the frequency generation signal SigFG.

Similarly, even when decelerating the motor 50, the mask time Tmsk of the mask signal MSK gradually lengthens in the same operation and the back electromotive noise can be suitably removed.

Figure 4:
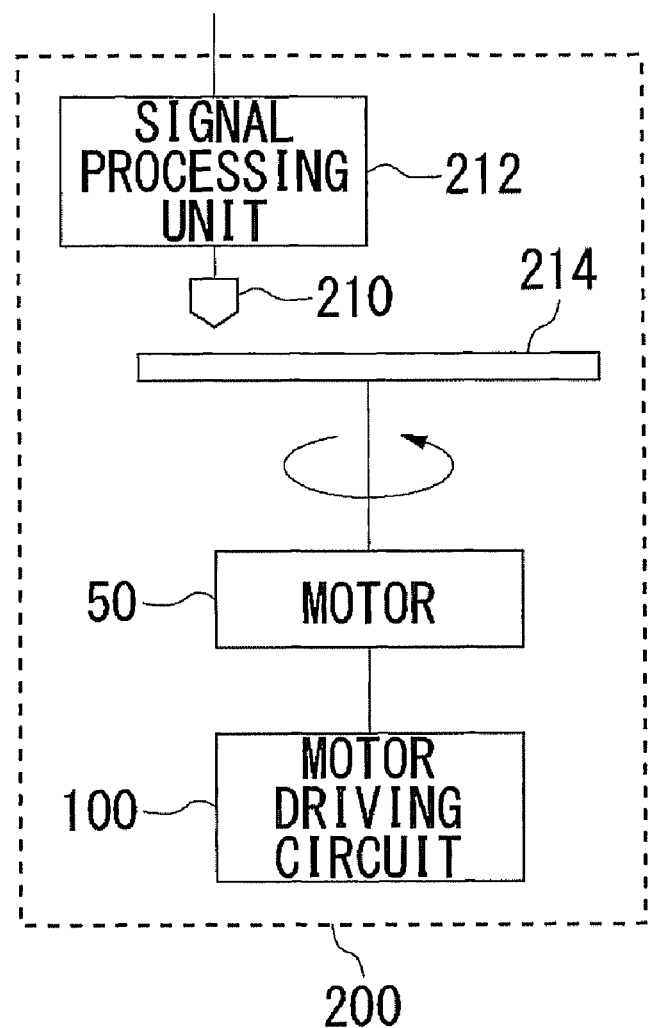
FIG. 4 is a block diagram showing a configuration of a disc apparatus in which the motor driving circuit shown in FIG. 1 or a motor driving circuit shown in FIG. 5 is mounted.

Next, an application of the motor driving circuit 100 according to the present embodiment will be described. FIG. 4 is a block diagram showing a configuration of a disc apparatus 200 in which the motor driving circuit 100 shown in FIG. 1 is mounted. The disc apparatus 200 is a unit which performs recording and reproducing processes with respect to optical discs such as a CD and a DVD, and the disc apparatus 200 is mounted on electronic equipment such as a CD player, a DVD player, and a personal computer. The disc apparatus 200 includes a pickup 210, a signal processing unit 212, a motor 50, and the motor driving circuit 100.

The pickup 210 writes desired data by irradiating laser on a disc 214, or reads out data written on the disc 214 by reading reflected light. The signal processing unit 212 performs necessary signal process such as an amplifying process and an analog/digital (referred to as A/D) conversion or a digital/analog (referred to as D/A) conversion with respect to data read or written by the pickup 210. The motor 50 is a spindle motor which is provided for rotating the disc 214. The disc apparatus 200 shown in FIG. 4 is especially required for reduction in size; and therefore, there is used a sensorless type which does not use a hall element or the like as the motor 50. The motor driving circuit 100 according to the present embodiment is suitably used to stably drive such a sensorless spindle motor.

Second Embodiment

Figure 5:
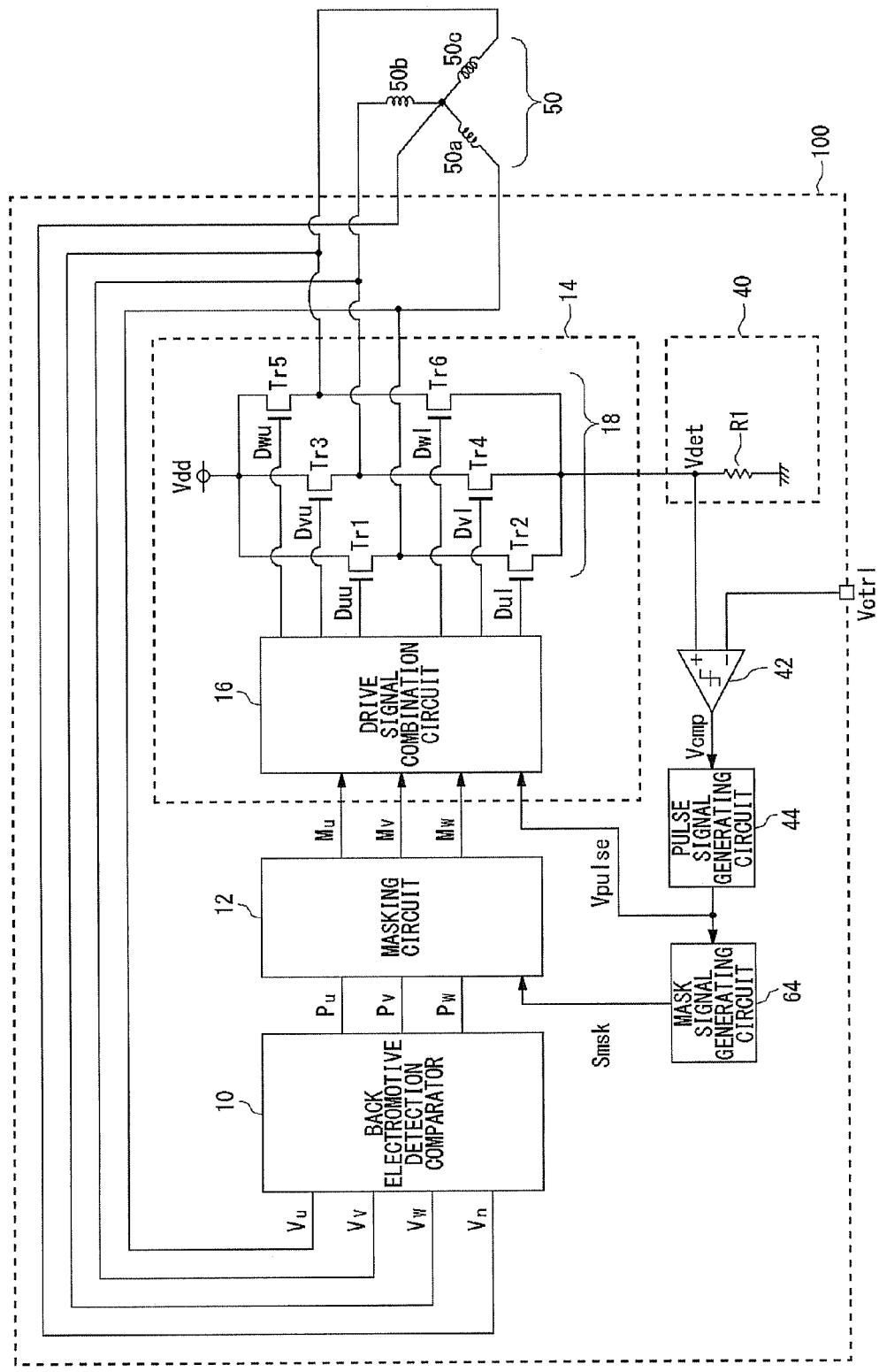
FIG. 5 is a circuit diagram showing a configuration of a motor driving circuit according to a second embodiment.

FIG. 5 is a circuit diagram showing a configuration of a motor driving circuit 100 according to a second embodiment. The motor driving circuit 100 supplies a drive current to a sensorless brushless DC motor (referred to as merely "motor 50") by a pulse driving method to control rotation. In the present embodiment, the motor 50 is a three-phase DC motor including coils 50a to 50c of U phase, V phase, and W phase.

The motor driving circuit 100 includes a back electromotive detection comparator 10, a masking circuit 12, an output circuit 14, a current-voltage conversion unit 40, a pulse modulation comparator 42, a pulse signal generating circuit 44, and a mask signal generating circuit 64. The motor driving circuit 100 is a functional IC integrally integrated on one semiconductor substrate.

The back electromotive detection comparator 10 compares back electromotive voltages Vu to Vw across respective phase coils 50a to 50c of the motor 50 respectively with a common voltage Vn of multiphase coils, and generates first rectangular wave signals Pu to Pw of respective phases. The first rectangular wave signal Pu is at a high level if Vu>Vn is satisfied; and, at a low level if Vu<Vn is satisfied. Similarly, the first rectangular wave signal Pv is at a high level if Vv>Vn is satisfied; and, at a low level if Vv<Vn is satisfied. The first rectangular wave signal Pw is at a high level if Vw>Vn is satisfied; and, at a low level if Vw<Vn is satisfied.

The masking circuit 12 performs a masking process which removes a noise component from the first rectangular wave signals Pv to Pw of respective phases output from the back electromotive detection comparator 10, and outputs the resultant signals as the second rectangular wave signals Mu to Mw of respective phases, using a mask signal Smsk to be described later.

The output circuit 14 controls a current to be supplied to respective phase coils 50a to 50c which constitute a stator of the motor 50 on the basis of the second rectangular wave signals Mu to Mw of respective phases and a pulse signal Vpulse output from the pulse signal generating circuit 44 to be described later.

The output circuit 14 includes a drive signal combination circuit 16 and a power transistor circuit 18. The power transistor circuit 18 includes 6 switching transistors Tr1 to Tr6; controls to supply a current to any one of coils 50a to 50c by on/off combination of the transistors Tr1 to Tr6; and performs a pulse driving that adjusts a torque by controlling an on/off time ratio. In the present embodiment, each of the transistors Tr1 to Tr6 is a metal-oxide semiconductor field-effect transistor (referred to as MOSFET). The transistors Tr1, Tr3, and Tr5 have one ends commonly connected to a power supply line to which a power supply voltage Vdd is applied; and other ends respectively connected to respective phase coils 50a, 50b, and 50c of the motor 50. The transistors Tr2, Tr4, and Tr6 have one ends respectively connected to the transistors Tr1, Tr3, and Tr5 and respective phase coils 50a, 50b, and 50c. On/off control of the transistors Tr1 to Tr6 is performed by the drive signal combination circuit 16.

The drive signal combination circuit 16 combines the second rectangular wave signals Mu to Mw output from the masking circuit 12 and a pulse signal Vpulse output from a pulse signal generating circuit 44 (to be described later) by logical operation, and generates drive signals Duu to Dul to be applied to gates of the transistors Tr1 to Tr6. That is, determination is made as to whether any combination of the transistors is turned on to energize any one of the coils on the basis of the second rectangular wave signals Mu to Mw. In the present embodiment, 180 degree energization may be performed or 120 degree energization may be performed. Furthermore, in order to perform torque control by adjusting an on/off time ratio on the basis of the pulse signal Vpulse, there may be performed a switching operation of using only the transistors Tr1, Tr3, and Tr5 on the high side; only the transistor Tr2, Tr4, and Tr6 on the low side; or all the transistors on both sides.

A current-voltage conversion unit 40 is provided between the power transistor circuit 18 and grounding. The current-voltage conversion unit 40 includes a conversion resistor R1. A voltage drop across the conversion resistor R1 is proportional to the drive current flowing in respective phase coils 50a, 50b, and 50c of the motor 50. The current-voltage conversion unit 40 outputs the voltage drop across the conversion resistor R1 as a detection voltage Vdet.

The detection voltage Vdet output from the current-voltage conversion unit 40 is inputted to a non-inversion input terminal of the pulse modulation comparator 42. A control voltage Vctrl which indicates a torque inputted from outside is inputted to an inversion input terminal of the pulse modulation comparator 42. The pulse modulation comparator 42 compares a detection voltage Vdet output from the current-voltage conversion unit 40 with the control voltage Vctrl. A comparison signal Vcmp output from the pulse modulation comparator 42 is at a high level if Vdet>Vctrl is satisfied; and, at a low level if Vdet<Vctrl is satisfied. The comparison signal Vcmp output from the pulse modulation comparator 42 is inputted to the pulse signal generating circuit 44.

The pulse signal generating circuit 44 refers to the comparison signal Vcmp output from the pulse modulation comparator 42, and outputs a pulse signal Vpulse which is at a low level (first level) during an interval from when the comparison signal Vcmp transits to the high level to when a predetermined off time Toff elapses and is at a high level (second level) during an interval except for the same. In other words, the pulse signal Vpulse is at the low level during the predetermined off time Toff after the detection voltage Vdet reaches the control voltage Vctrl; and, is at the high level during an interval except for the same. For example, the off-time Toff is set to several µs and, more specifically, set to 5.7 µs as one example.

The pulse signal generating circuit 44 can be configured using a counter circuit that starts counting the off-time Toff, for example, when the level transition of the comparison signal Vcmp occurs. In this case, the counter circuit outputs the pulse signal Vpulse which is at the low level during an interval from the level transition of the comparison signal Vcmp and to the completion of counting; and then, transits to the high level.

In this case, the low level (first level) of the pulse signal Vpulse corresponds to non-conducting states of respective phase coils 50a to 50c; and the high level (second level) corresponds to conducting states of respective phase coils 50a to 50c. That is, the high level and the low level of the pulse signal Vpulse are alternatively repeated; and accordingly, a current is intermittently flown into the coils 50a to 50c of the motor 50, and a pulse driving is performed.

In the pulse signal Vpulse generated by the motor driving circuit 100 according to the present embodiment, the off-time Toff is constant; and an on-time changes in response to the control voltage Vctrl which indicates a torque. That is, the off-time is constant; and the pulse driving of the motor 50 is performed by the pulse frequency modulation (referred to as PFM) method whose frequency changes in response to the torque.

The mask signal generating circuit 64 refers to the pulse signal Vpulse output from the pulse signal generating circuit 44 and generates the mask signal Smsk. The mask signal generating circuit 64 sets the mask signal Smsk to a high level during an interval from when the pulse signal Vpulse transits to the low level (first level) to when a predetermined first mask time Tmsk1 elapses. Further, the mask signal generating circuit 64 sets the mask signal Smsk to the high level during an interval from when the pulse signal Vpulse transits to the high level (second level) to when a predetermined second mask time Tmsk2 elapses.

In the present embodiment, the first mask time Tmsk1 is desirable to be set shorter than the off-time Toff. Furthermore, the first mask time Tmsk1 is desirable to be set not more than the second mask time Tmsk2. The present embodiment is set to be Tmsk1=Tmsk2=4.7 µs.

The mask signal generating circuit 64 can be configured including a counter circuit which counts the first mask time Tmsk1 and the second mask time Tmsk2 when the transition of the pulse signal Vpulse occurs, for example. In this case, the counter circuit counts 4.7 µs at every transition of the pulse signal Vpulse, that is, with the positive edge and the negative edge; and the mask signal Smsk is at the high level during an interval of counting.

Figure 6:
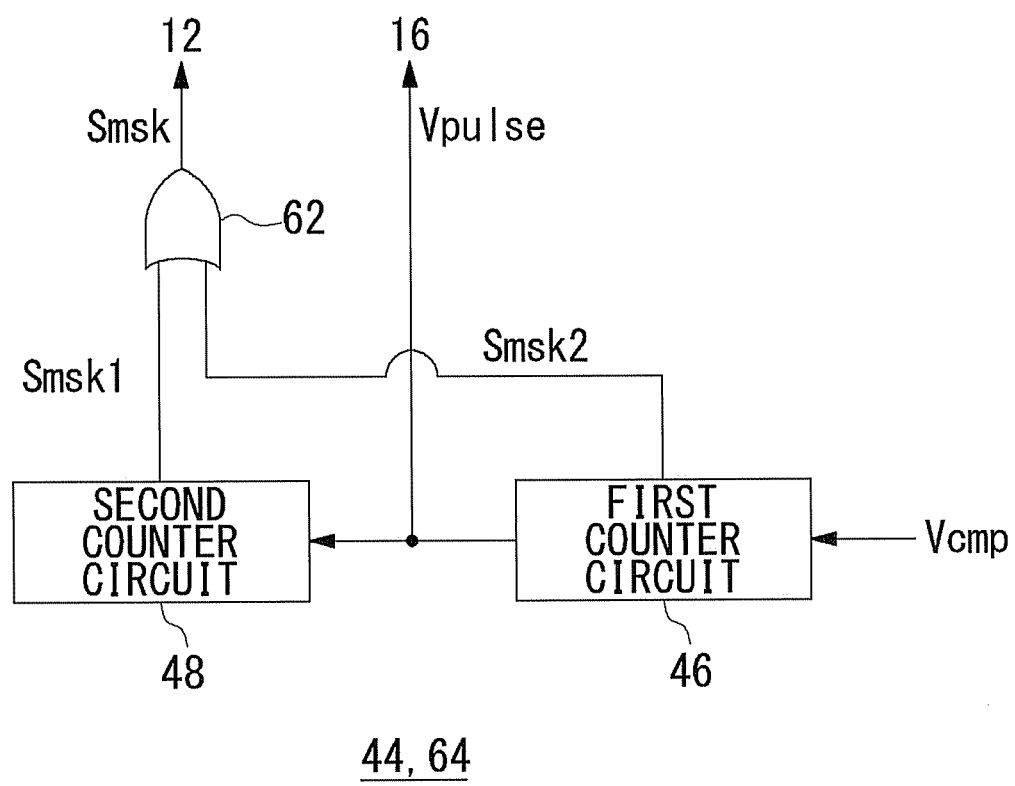
FIG. 6 is a block diagram showing an example of a configuration of a pulse signal generating circuit and a mask signal generating circuit.

The pulse signal generating circuit 44 and the mask signal generating circuit 64 may be configured as follows. FIG. 6 is a block diagram showing an example of a configuration of the pulse signal generating circuit 44 and the mask signal generating circuit 64.

The pulse signal generating circuit 44 and the mask signal generating circuit 64 shown in FIG. 6 are integrally configured including a first counter circuit 46, a second counter circuit 48, and an OR gate 62. The first counter circuit 46 starts counting when level transition of the comparison signal Vcmp occurs. The first counter circuit 46 outputs a pulse signal Vpulse to be at the low level during an interval from when counting starts to when the off-time Toff elapses. Furthermore, the first counter circuit 46 outputs a second mask signal Smsk2 which is to be a high level during an interval from when the counting starts to when the second mask time Tmsk2 elapses.

When the pulse signal Vpulse output from the first counter circuit 46 transits from the high level to the low level, the second counter circuit 48 starts counting when the transition occurs. The second counter circuit 48 outputs a first mask signal Smsk1 which is at a high level during an interval from when the counting starts to when the first mask time Tmsk1 elapses. The OR gate 62 outputs logical sum of the first mask signal Smsk1 and the second mask signal Smsk2, as the mask signal Smsk. The mask signal Smsk is output to the masking circuit 12.

The masking circuit 12 performs a masking process which removes a noise component from the first rectangular wave signals Pv to Pw of respective phases output from the back electromotive detection comparator 10, and outputs the resultant signals as the second rectangular wave signals Mu to Mw of respective phases, using the mask signal Smsk. More specifically, the masking circuit 12 performs the masking process that nullifies level fluctuation of the first rectangular wave signals Pu to Pw output from the back electromotive detection comparator 10 during an interval when the mask signal Smsk is at the high level, and outputs the resultant signals as the second rectangular wave signals Mu to Mw of respective phases.

That is, even signal levels of the first rectangular wave signals Pu to Pw fluctuate; their fluctuations do not reflect on the second rectangular wave signals Mu to Mw during an interval when a mask signal MSK is at a high level. On the other hand, the second rectangular wave signals Mu to Mw are equal to the first rectangular wave signals Pu to Pw, respectively, during an interval when the mask signal MSK is at a low level.

As described above, the output circuit 14 intermittently supplies the drive current to respective phase coils of a multiphase motor on the basis of the second rectangular wave signals Mu to Mw of respective phases and the pulse signal Vpulse. The drive signal combination circuit 16 combines the second rectangular wave signals Mu to Mw output from the masking circuit 12 and the pulse signal Vpulse output from the pulse signal generating circuit 44 by logical operation, and generates drive signals Duu to Dul to be applied to gates of the transistors Tr1 to Tr6.

An operation of a thus configured motor driving circuit 100 will be described. FIGS. 7A to 7F are time charts showing operation states of the motor driving circuit 100 shown in FIG. 5; and there are shown states in which a pulse signal Vpulse is generated in a pulse signal generating circuit 44, and a mask signal Smsk is generated in a mask signal generating circuit 64.

FIG. 7A represents a detection voltage Vdet; FIG. 7B represents a comparison signal Vcmp; FIG. 7C represents the pulse signal Vpulse; FIG. 7D represents a first mask signal Smsk1; FIG. 7E represents a second mask signal Smsk2; and FIG. 7F represents the mask signal Smsk. The case where a current flows in coils 50a and 50b will be described in the following description.

The pulse signal Vpulse is at a high level (second level) at time t0. When the pulse signal Vpulse is at the high level, transistors Tr1 and Tr4 are turned on in a drive signal combination circuit 16. Determination is made as to whether any combination of the transistors is turned, which changes in response to a rotor position, on the basis of second rectangular wave signals Mu to Mw.

When the transistors Tr1 and Tr4 are turned on, a drive current flows from a power supply line to a path of the transistor Tr1, coils 50a and 50b, and the transistor Tr4; and the drive current starts to rise with time. The drive current flows through grounding via a conversion resistor R1 of a current-voltage conversion unit 40. The detection voltage Vdet is proportional to the drive current; and therefore, the voltage starts to rise with time after time t0.

When the detection voltage Vdet reaches a control voltage Vctrl at time t1, the comparison signal Vcmp output from a pulse modulation comparator 42 is at a high level. When the comparison signal Vcmp is at the high level, the pulse signal generating circuit 44 sets the pulse signal Vpulse to a low level (first level). When the pulse signal Vpulse is at the low level, the drive signal combination circuit 16 makes the transistors Tr1 and Tr4 turn off.

When the pulse signal Vpulse transits from the high level to the low level at time t1, the mask signal generating circuit 64 sets a first mask signal Smsk1 to a high level, and switches the first mask signal Smsk1 to a low level at time t2 after elapsing the first mask time Tmsk1.

The pulse signal generating circuit 44 switches the pulse signal Vpulse to the high level at time t3 after elapsing an off-time Toff from time t1. The transistors Tr1 and Tr4 turn on again at time t3.

When the pulse signal Vpulse transits from the low level to the high level, the mask signal generating circuit 64 sets a second mask signal Smsk2 to a high level, and switches the second mask signal Smsk2 to a low level at time t4 after elapsing a second mask time Tmsk2. The mask signal Smsk can be obtained by logical sum of the first mask signal Smsk1 and the second mask signal Smsk2. The mask signal Smsk is output to a masking circuit 12, and the masking circuit 12 performs a masking process that nullifies level fluctuation of first rectangular wave signals Pu to Pw during an interval when the mask signal Smsk is at the high level.

FIG. 8A is a time chart showing a back electromotive voltage Vu and a common voltage Vn of U phase coil of a motor 50; and FIG. 8B is a time chart showing a mask signal Smsk. FIGS. 8A and 8B show a waveform in the case where the motor 50 is driven by 180 degree energization; however, the present invention is not limited to this, but, it may be driven by 120 degree energization or the like. In the same drawings, a solid line shows the back electromotive voltage Vu of U phase, and a dashed line shows the common voltage Vn. A similar waveform appears with a shift in phase by 60 degrees in V phase and W phase. A cycle of fluctuation in the back electromotive voltage Vu changes in response to pulse driving frequency. In the case of performing the 180 degree energization, as shown in FIG. 8, the back electromotive voltage Vu of U phase is affected by driving states of V phase and W phase. That is, during an interval between times t0 and t1, an interval φ1 when both back electromotive voltages Vv and Vw of V phase and W phase are at a low level and an interval φ2 when either the back electromotive voltage Vv or Vw of V phase and W phase is at a high level are repeated. During an interval between times t1 and t2, the back electromotive voltage Vu of U phase is fixed at the high level. During an interval between times t2 and t3, an interval φ3 when both the back electromotive voltages Vv and Vw are at the high level and an interval φ4 when either the back electromotive voltage Vv or Vw is at the low level are repeated.

As described above, the motor driving circuit 100 according to the embodiment mutually switches on the basis of the back electromotive voltages Vu to Vw across the coils 50a to 50c, and drives a sensorless motor. Specifically, the back electromotive voltage Vu is compared with the common voltage Vn by a back electromotive detection comparator 10 to generate the first rectangular wave signal Pu.

In this case, spike-like back electromotive noise Nx is generated in the back electromotive voltage Vu shown in FIG. 8A in response to a pulse driving cycle. Therefore, when magnitude relation between the common voltage Vn and the back electromotive voltage Vu is inverted by the spike-like back electromotive noise, the back electromotive noise also appears in the first rectangular wave signal Pu.

As shown in FIG. 8B, the mask signal Smsk is at the high level during a predetermined mask time from the positive edge and the negative edge of the pulse signal Vpulse for the pulse driving. The masking circuit 12 nullifies the level fluctuation of the first rectangular wave signal Pu during an interval when the mask signal Smsk output from the mask signal generating circuit 64 is at the high level. Therefore, the noise component of the first rectangular wave signal Pu which appears during the interval when the mask signal Smsk is at the high level does not appear in the second rectangular wave signal Mu. As a result, a zero cross point where the back electromotive voltage Vu of U phase crosses the common voltage Vn is suitably detected, and good phase switching can be performed.

The same process are made for V phase and W phase, the second rectangular wave signals Mv and Mw in which the noise component is masked from the first rectangular wave signals Pv and Pw are generated.

The motor driving circuit 100 performs pulse driving of the motor 50 by repeating the above operation. According to the motor driving circuit 100 of the present embodiment, the mask signal Smsk which is at the high level during a predetermined time is generated in every on/off switching of energization to the coils of the motor by the pulse driving. Therefore, the back electromotive noise generated by switching energization to the coils of the motor 50 can be suitably removed by the mask signal Smsk which is at the high level in response to the timing.

In addition, according to the motor driving circuit 100 of the present embodiment, a zero cross where the back electromotive voltage crosses generates during an interval when the mask signal Smsk is at the low level; and therefore, phase can be switched by surely detecting the zero cross. Further, in the present embodiment, relation between the first mask time Tmsk1 and the second mask time Tmsk2 is set to be Tmsk1≧Tmsk2; and therefore, a detection time when the mask signal Smsk is at the low level can be surely ensured.

If the motor is driven by the pulse width modulation (referred to as PWM) method, the off-time changes in response to a torque. In this case, when the torque increases and the off-time shortens, it becomes difficult to set the mask. On the other hand, since the motor driving circuit 100 of the present embodiment does not adopt the PWM method, but, the motor driving circuit 100 adopts the PFM method; the off-time Toff of the predetermined interval can be ensured just before the on-time when the back electromotive noise appears; and therefore, a mask interval can be surely set.

FIGS. 9A to 9F are time charts showing operation states of the motor driving circuit 100 shown in FIG. 5 in the case where the control voltage Vctrl is low. In this case, an energization time to the coils of the motor 50 is shorter than the second mask time Tmsk2. Therefore, zero cross detection during the on-time is not performed. Also in this case, since it is set to be Toff<Tmsk1; the mask signal Smsk is at the low level during a certain interval, just before when the pulse signal Vpulse is at the high level; and therefore, the zero cross can be surely detected.

Lastly, an application of the motor driving circuit 100 according to the present embodiment will be described. FIG. 4 is a block diagram showing a configuration of a disc apparatus 200 in which the motor driving circuit 100 shown in FIG. 5 is mounted. The disc apparatus 200 is a unit which performs recording and reproducing processes with respect to optical discs such as a CD and a DVD, and the disc apparatus 200 is mounted on electronic equipment such as a CD player, a DVD player, and a personal computer. The disc apparatus 200 includes a pickup 210, a signal processing unit 212, a motor 50, and the motor driving circuit 100.

The pickup 210 writes desired data by irradiating laser on a disc 214, or reads out data written on the disc 214 by reading reflected light. The signal processing unit 212 performs necessary signal process such as an amplifying process and an analog/digital (referred to as A/D) conversion or a digital/analog (referred to as D/A) conversion with respect to data read or written by the pickup 210. The motor 50 is a spindle motor which is provided for rotating the disc 214. The disc apparatus 200 shown in FIG. 4 is especially required for reduction in size; and therefore, there is used a sensorless type which does not use a hall element or the like as the motor 50. The motor driving circuit 100 according to the present embodiment is suitably used to stably drive such a sensorless spindle motor.

As described above, the present invention is described based on the preferred embodiments. It is to be understood to those skilled in the art that the above preferred embodiments are exemplifications, various modifications are possible in the combination of their respective constituent elements and respective processing processes, and such modifications fall within the scope of the present invention.

In the embodiments, the case where a three phase motor is driven is described; however, the present invention can be suitably used for driving a sensorless motor except for the three phase motor.

Furthermore, in the embodiments, the back electromotive detection comparator 10 compares the back electromotive voltages Vu to Vw across respective phase coils 50a to 50c of the motor 50 respectively with the common voltage Vn of respective phase coils; however, the first rectangular wave signals Pu to Pw may be generated by dividing the back electromotive voltages using resistors if required and by comparing the divided voltages.

Setting of logic of the high level and the low level of the signals described in the embodiments are an example; various modifications can be considered in the configuration of a logic circuit block; and such modifications are included in the scope of the present invention.

In the embodiments, the case where the motor driving circuit 100 is integrally integrated; however, the present invention is not limited to this, but, for example, the transistors Tr1 to Tr6 and the conversion resistor R1 which constitute the power transistor circuit 18 may be provided on the outside of the motor driving circuit 100 as a discrete element and a chip component.

While the preferred embodiments of the present invention have been described using specific terms, such description is for illustrative purposes only, and it is to be understood that changes and variations may be made without departing from the spirit or scope of the appended claims.

What is claimed is:

1. A motor driving circuit which supplies a drive current to a multiphase motor to drive said multiphase motor, said motor driving circuit comprising:
a back electromotive detection comparator which compares a back electromotive voltage across each phase coil of said multiphase motor respectively with a common voltage of said each phase, and generates a first rectangular wave signal of each phase;
a masking circuit which performs a masking process that removes a noise component from a first rectangular wave signal of said each phase output from said back electromotive detection comparator, and outputs the resultant signal as a second rectangular wave signal of each phase;
an output circuit which supplies the drive current to each phase coil of said multiphase motor on the basis of the second rectangular wave signal of said each phase;
a frequency generating circuit which detects the edge of the second rectangular wave signal of said each phase, and generates a frequency generation signal whose level switches at each detected edge; and
a mask signal generating circuit which generates a mask signal to be at a predetermined level during an interval multiplied by a predetermined coefficient to a pulse width of the frequency generation signal after level transition of the frequency generation signal, wherein
said masking circuit performs a masking process that nullifies level fluctuation of the first rectangular wave signal during an interval when the mask signal is at the predetermined level.

2. The motor driving circuit according to claim 1, wherein said mask signal generating circuit includes:
a counter which is reset at every level transition of the frequency generation signal, and starts counting;
a register which holds a counted value at the time of reset counted by said counter; and
a mask width setting unit which outputs a mask signal having a pulse width corresponding to an obtained value multiplied by the predetermined coefficient to the counted value held by said register.

3. The motor driving circuit according to claim 1, wherein said mask signal generating circuit outputs the mask signal having a predetermined fixed value as a pulse width when starting driving of said multiphase motor.

4. The motor driving circuit according to claim 1, wherein said motor driving circuit is integrally integrated on one semiconductor substrate.

5. A disc apparatus comprising:
a spindle motor that is a multiphase motor which rotates a disc; and
a motor driving circuit that drives said spindle motor, as set forth in claim 1.

6. A motor driving circuit which supplies a drive current to a multiphase motor to drive said multiphase motor, said motor driving circuit comprising:
a current-voltage conversion unit which converts the drive current flowing in each phase coil of said multiphase motor into a voltage;
a pulse modulation comparator which compares a detection voltage output from said current-voltage conversion unit with a control voltage that directs a torque;
a pulse signal generating circuit which refers to a comparison signal output from said pulse modulation comparator, and generates a pulse signal which is at a first level indicating a non-conducting state of said each phase coil during a predetermined off time after said detection voltage reaches said control voltage and is at a second level indicating a conducting state of said each phase coil during an interval except for the same;
a mask signal generating circuit which generates a mask signal to be at a predetermined level during an interval from when the pulse signal transits to the first level to when a predetermined first mask time has passed, and an interval from when the pulse signal transits to the second level to when a predetermined second mask time has passed;
a back electromotive detection comparator which compares a back electromotive voltage across each phase coil of said multiphase motor respectively with a common voltage of said each phase coil, and generates a first rectangular wave signal of each phase;
a masking circuit which refers to the mask signal output from said mask signal generating circuit, performs a masking process that nullifies level fluctuation of the first rectangular wave signal of said each phase output from said back electromotive detection comparator during an interval when the mask signal is at the predetermined level, and outputs the resultant signal as a second rectangular wave signal of each phase; and
an output circuit which intermittently supplies said drive current to each phase coil of said multiphase motor on the basis of the second rectangular wave signal and the pulse signal of said each phase.

7. The motor driving circuit according to claim 6, wherein said first mask time is set to be shorter than said off-time.

8. The motor driving circuit according to claim 6, wherein said first mask time is set to be not more than said second mask time.

9. The motor driving circuit according to claim 6, wherein said pulse signal generating circuit includes a counter circuit which starts counting of said off-time when level transition of the comparison signal occurs; and outputs the pulse signal which is at the first level during an interval from level transition of the comparison signal and to completion of counting, and then, transits to the second level.

10. The motor driving circuit according to claim 6, wherein said mask signal generating circuit includes a counter circuit which counts said first and second mask times when level transition of the pulse signal occurs.

11. The motor driving circuit according to claim 6, wherein said pulse signal generating circuit and said mask signal generating circuit are integrally configured, including:
a first counter circuit which starts counting when level transition of the comparison signal occurs, and outputs the pulse signal whose level transits after elapsing said off-time and a second mask signal whose level transits after elapsing said second mask time; and
a second counter circuit which starts counting when level transition of the pulse signal output from said first counter circuit occurs, and outputs a first mask signal whose level transits after elapsing said first mask time, and
said pulse signal generating circuit and said mask signal generating circuit output a logical operation result of the first mask signal and the second mask signal as the mask signal.

12. The motor driving circuit according to claim 6, wherein said motor driving circuit is integrally integrated on one semiconductor substrate.

13. A disc apparatus comprising:
a spindle motor that is a multiphase motor which rotates a disc; and a motor driving circuit that drives said spindle motor, as set forth in claim 6.

* * * * *